United States Patent [19]

Zelczer et al.

[11] Patent Number: 5,553,498
[45] Date of Patent: Sep. 10, 1996

[54] PIPE AND DUCT RUN LOCATOR

[76] Inventors: Alex Zelczer; Ruth Zelczer, both of 3840 Severn Rd., Cleveland Heights, Ohio 44118

[21] Appl. No.: 251,473

[22] Filed: May 31, 1994

Related U.S. Application Data

[63] Continuation-in-part of Ser. No. 508,900, Apr. 12, 1990, abandoned.

[51] Int. Cl.$^6$ .................................................. G01H 17/00
[52] U.S. Cl. ............................... 73/584; 73/662; 367/120
[58] Field of Search .......................... 73/570, 584, 591, 73/592, 622, 662, 632, 597, 40.5 A; 367/137, 138, 191, 120, 13

[56] References Cited

U.S. PATENT DOCUMENTS

| | | | |
|---|---|---|---|
| 3,055,209 | 9/1962 | Reid et al. | 73/40.5 A |
| 3,223,194 | 12/1965 | Michael | 73/592 |
| 3,264,864 | 8/1966 | Reid et al. | 73/592 |
| 4,021,773 | 5/1977 | Keenan | 73/40.5 A X |
| 4,075,601 | 2/1978 | Flournoy | 73/40.5 A X |
| 4,242,744 | 12/1980 | Rottmur | 73/40.5 A |
| 4,911,012 | 3/1990 | Ziska | 73/584 |

FOREIGN PATENT DOCUMENTS

| | | |
|---|---|---|
| 2822197 | 11/1979 | Germany . |
| 59-111036 | 6/1984 | Japan . |
| 60-238734 | 11/1985 | Japan . |
| 60-243561 | 12/1985 | Japan . |

*Primary Examiner*—Michael J. Brock
*Attorney, Agent, or Firm*—Renner, Otto, Boisselle & Sklar

[57] ABSTRACT

An apparatus and method for identifying a conduit at a second location remote from a known first location of the conduit, characterized by a vibration device and means for removably coupling the vibration device to a wall of the conduit for transmission of vibration to and/or generation of vibration in the conduit, thereby enabling identification of the conduit at the remote second location.

4 Claims, 2 Drawing Sheets

PIPE AND DUCT RUN LOCATOR

RELATED APPLICATION DATA

This application is a continuation-in-part of U.S. patent application Ser. No. 07/508,900, filed Apr. 12, 1990, entitled PIPE AND DUCT RUN LOCATOR, now abandoned, which is hereby incorporated herein by reference.

DISCLOSURE

The present invention relates generally to a device and method for locating or identifying the run of a pipe, duct, tube or other conduit. More specifically, the invention relates to a device and method for identifying the destination of heating and cooling ducts, electrical and plumbing conduits or other resounding enclosures or hollow tubes in a time efficient and labor efficient manner. More generally, the present invention relates to a device and method for communicating an identifying characteristic along a conduit so that the identifying characteristic may be detected at a remote location along the conduit.

BACKGROUND

Situations arise where it is necessary to identify a remote location along the path of a particular pipe or duct run. For example, when a serviceman is working on a forced air heating and cooling system, it may be necessary for him to identify the room or area serviced by a particular air duct. As another example, someone working with electrical wiring or plumbing may find it necessary to determine which wiring conduit or pipe leads to a particular electrical outlet or water spigot. A worker would have little difficulty performing these tasks if the air duct, wiring conduit or plumbing conduit is totally exposed. All he would have to do is visually follow the duct.

A problem arises when the duct or other conduit disappears into and changes course in covered walls, floors and/or ceilings. With the conduit hidden from view, a worker may find it extremely difficult to determine the path of the conduit. Furthermore, the conduit may be located at locations along its path in close proximity to several other similar conduits, each of their paths being unknown to the extent that it is difficult if not impossible to distinguish the conduit of interest from another.

In the past, a worker could guess at the progression of a particular run. This would typically involve the worker making several assumptions as to what would be the most likely direction the hidden path would travel. If and when the worker ultimately located a reappearing conduit segment, there may be uncertainty as to whether the conduit segment was in fact part of the same conduit or some other conduit.

Another approach utilized in the past has involved a team of workers attempting to locate the destination of a particular pipe or duct run. One worker would strike the duct or pipe of interest using a heavy object such as a hammer or wrench. Meanwhile, a second worker would move between remote locations attempting to identify the destination of the particular run by listening for the sound of the striking that is communicated through the pipe or duct. Conversely, the second worker would remain at a particular location along and usually at the end of a conduit run of interest while the first worker would repeatedly strike numerous conduits at remote locations. Again, the second worker would listen for the sound created by the repeated striking to determine which conduit at a remote location corresponded to the conduit of interest. While these procedures were generally successful, at least two workers were required to accomplish the task. In addition, the sound created by the first worker repeatedly striking the conduit may be intermittent and of uneven loudness. This made it difficult for the second worker to hear and distinguish whether the sound came from the conduit being struck or nearby conduits. Furthermore, the first worker may issue to the conduit a blow that may damage the conduit. Moreover, repeated striking of the conduit is a tedious and tiring task.

Therefore, a need exists for a method and apparatus for quickly and accurately identifying a remote location along the path of a particular pipe, duct or other conduit. The method and apparatus desirably should not require the services of two or more workers and should be both economical and easy to implement.

SUMMARY OF THE INVENTION

The present invention has been developed to overcome the foregoing shortcomings of previous techniques for identifying a remote location along a particular pipe or duct run, primarily one whose path is partially or totally hidden from view. The invention provides a method and apparatus that may be used by just one worker to quickly and accurately identify a remote location along the run of a particular pipe, duct or other conduit. The apparatus may be of economical construction and is easy to use according to the method of the invention.

According to one aspect of the invention, an apparatus for identifying a conduit at a second location remote from a known first location of the conduit comprises a vibration device and means for removably coupling the vibration device to a wall of the conduit for transmission of vibration to and/or generation of vibration in the conduit, thereby enabling identification of the conduit at the remote second location.

According to another aspect of the present invention, a method is provided for identifying a conduit at a second location remote from a known first location, the method including the steps of automatically and continuously generating vibrations at a first location for transmission of the vibrations along the length of the conduit; and identifying a remotely located second location of the conduit by detecting the vibrations.

More particularly, the apparatus and method of the invention are characterized by the production of human audible sound, thereby enabling identification of the remotely located second location of the conduit by a person listening for the sound generated by the apparatus without the aid of any electrically powered listening device.

According to one particular aspect of the invention, a portable apparatus for identifying a heating and/or cooling duct at a second location in a building remote from a known first location of the heating and/or cooling duct, comprises a housing, an electrical vibration device mounted in the housing and including means for generating human audible sound vibrations in the range of 20–10,000 Hz, means for connecting said electrical vibration device to a battery, and means for detachably securing the housing to a wall of the heating and/or cooling duct.

According to another particular aspect of the invention, a method for identifying a heating and/or cooling duct at a second location in a building remote from a known first location of the heating and/or cooling duct, comprising the steps of detachably securing a portable apparatus including a battery powered vibration device to the wall of the heating and/or cooling duct at a first location in a building; operating the apparatus to automatically generate human audible sound in the range of 20–10,000 Hz in the heating and/or cooling duct at the first location for transmission of the sound along the length of the heating and/or cooling duct; and identifying the heating and/or cooling duct at a second location remote from the first location by listening for the vibrations without the aid of any electrically powered listening device.

The foregoing and other features of the invention are hereinafter fully described and particularly pointed out in claims, the following description and the annexed drawings setting forth in detail a certain illustrative embodiment of the invention, this being indicative, however, of but one of the various ways in which the principles of the invention may be employed.

DETAILED DESCRIPTION

Figure 1:
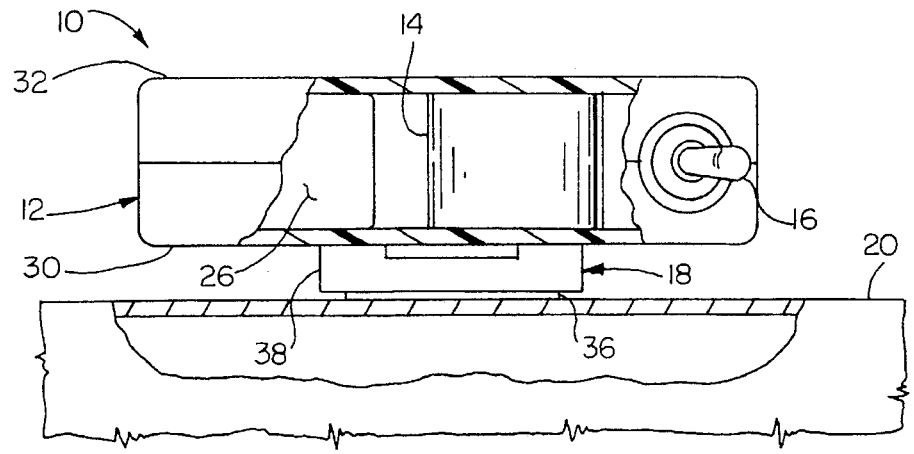
FIG. 1 is an elevational view, partly broken away in section, of a pipe and duct run locator in accordance with one embodiment of the present invention.
Figure 2:
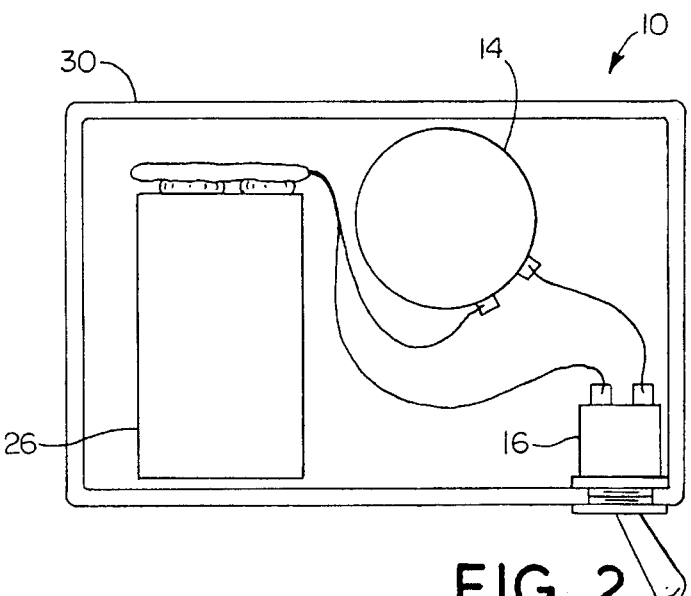
FIG. 2 is a top plan view of the pipe and duct run locator of FIG. 1.

Referring to FIGS. 1 and 2, an apparatus according to the invention, herein colloquially referred to as a pipe and duct run locator, is indicated generally at 10. The pipe and duct run locator 10 includes a housing 12 which contains a vibration device 14 that may be turned on and off by a switch 16. The locator 10 further includes an attachment device 18 for removably coupling the housing 12 and more particularly the vibration device to a wall of a pipe, duct or other conduit 20.

In the illustrated embodiment the vibration device 14 is a conventional electric buzzer having a mechanical vibrating element which generates mechanical vibration as well as sound vibration. The electric buzzer is powered by a battery 26 which is electrically connected in series with the buzzer and switch 16 as shown in FIG. 2. The switch may be a toggle switch as shown in FIGS. 1 and 2, and the battery, such as a conventional 9 volt battery, preferably is housed within the housing along with the electric buzzer.

As further shown in FIGS. 1 and 2, the housing 12 has a base 30, a cover 32 and an end plate 34. The cover is removably secured to the base by screws (not shown) or other suitable fasteners to permit replacement of the battery. When the base and cover are secured together the electric buzzer 14 preferably is sandwiched tightly therebetween to provide good mechanical coupling between the buzzer and housing. Also, the end plate 34 is trapped between the cover and base at one axial end of the housing. The end plate 34 is foraminous, includes one or more apertures 35 which permit direct forward passage of sound from the buzzer to outside the housing along the axis of the housing which normally will be oriented parallel to a duct in which the locator is positioned. The opposite axial or rear end of the housing is closed to form a reflector that redirects sound from the buzzer back towards the opposite open end of the housing to increase the sound emitted axially forwardly from the housing.

The attachment device 18 in the illustrated embodiment includes a magnet or magnets 36 in a magnet retainer 38 fixed to the underside of the housing base 30. The magnets provide for quick and easy attachment of the pipe and duct run locator to a conduit made of steel or other ferromagnetic material. The magnet and retainer therefor may be of conventional type like those used to hold cabinet doors closed. Preferably the magnets are loosely retained in the retainer so that they may move to accommodate, for example, the curved surface of a round or oval duct.

In operation, the locator 10 is attached and thereby mechanically coupled to the conduit 20 by means of the magnet or magnets 36. When the switch 16 is in the on position, the vibration device is activated to generate mechanical and sound vibration. The conduit will pick up sound emitted by the vibration device for transfer along the conduit. Preferably the sound is human audible sound in the range of 20–10,000 Hz and more preferably in the range of 50–5,000 Hz. A further sound frequency range is 50–2,000 Hz. Mechanical vibration generated by the vibration device will cause the housing to vibrate, and with the housing rigidly attached to the conduit, vibration is transmitted to the conduit wall for transmission along the conduit. While the mechanical vibration may dissipate a relatively short distance along the conduit, the mechanical vibration will generate noise or other human audible sound (as in the above mentioned frequency ranges) within the conduit that will reverberate a relatively long distance along the conduit for detection at locations remote and even quite distant from the location of the pipe and duct locator. The generated vibrations will also be uniform and continuous.

When the pipe and duct run locator 10 is thusly employed, a single worker can identify a second location along the path of a conduit that is remote from a known first location at which the locator is attached to the conduit. That is, the worker can simply attach the locator to the conduit of interest at its exterior surface or even its interior surface depending on access and convenience considerations. The switch 16 may then be moved to its on position to operate the electric buzzer 14, after which the worker is then free to proceed to a conduit segment at a remote location for detecting the vibration and/or noise to determine whether the conduit segment at that particular remote location is part of the conduit of interest rather than some other conduit. The remotely located pipe or duct which exhibits the greatest vibration and noise may be conclusively identified as being located along the path of the particular conduit to which the locator 10 is mounted.

A variety of techniques may be utilized to determine the conduit which displays the greatest vibration characteristics. Most notably, a worker would normally simply listen to the pipe or duct of interest, as at a duct register, in order to measure the associated noise. The mechanical vibration of the pipe or duct could be sensed by simply touching the pipe or duct with one's finger.

Alternatively, when attempting to identify a location along a particularly lengthy duct run, the worker may utilize a decibel meter to determine the noise characteristics of the conduit. In a similar manner, the worker may utilize a vibration meter to determine which conduit displays the most vibration.

A somewhat unconventional technique involves a worker simply holding a long screwdriver up to his or her ear. By pressing the tip of the screwdriver against the pipe or duct while pressing the screwdriver handle against his ear, any vibration can be felt and/or heard.

The present invention therefore offers the advantages of fast attachment and detachment. It is inexpensive and easy to implement. The invention requires only the services of one worker.

In some situations the wall of the conduit may be a soft, pliable material which is not particularly suited for generation or transmission of mechanical vibration. In these situations the pipe and duct run locator 10 may be placed within the conduit 14. For example, a pipe or duct 14 made of a pliable plastic, such as vinyl, may have an incision made in the wall thereof of sufficient size to permit insertion of the locator therethrough. With the locator disposed within the conduit, the sound originating from the locator, after having been turned on, will reverberate along the conduit 14 for detection at a remote location. After spaced apart segments of the conduit have been matched to one another as desired, the locator may be removed from the interior of the conduit and the incision closed by suitable means such as by duct tape.

Therefore, the present invention allows sound and mechanical vibration, either individually or in conjunction with one another, to be transmitted through or along the conduit run. If the pipe, duct or other conduit is made of a rigid ferromagnetic material, the locator 10 may simply be attached to the exterior of the conduit 14. Both sound and vibration from the locator 10 will then be effectively transmitted to and transferred along the conduit 14. If the conduit is made of a softer, pliable material, the locator 10 may be inserted within the conduit. While mechanical vibration from the locator 10 is unlikely to be transmitted any great distance due to dampening effects, the sound from the locator will resonate from within the conduit 14 throughout the conduit run.

A worker may also encounter conduits that are relatively rigid like steel ducts but which are made of a non-ferromagnetic material such as aluminum. In these instances the magnets 36 will not be able to couple the locator to the conduit. Instead, an alternative attachment device may be utilized.

Figure 3:
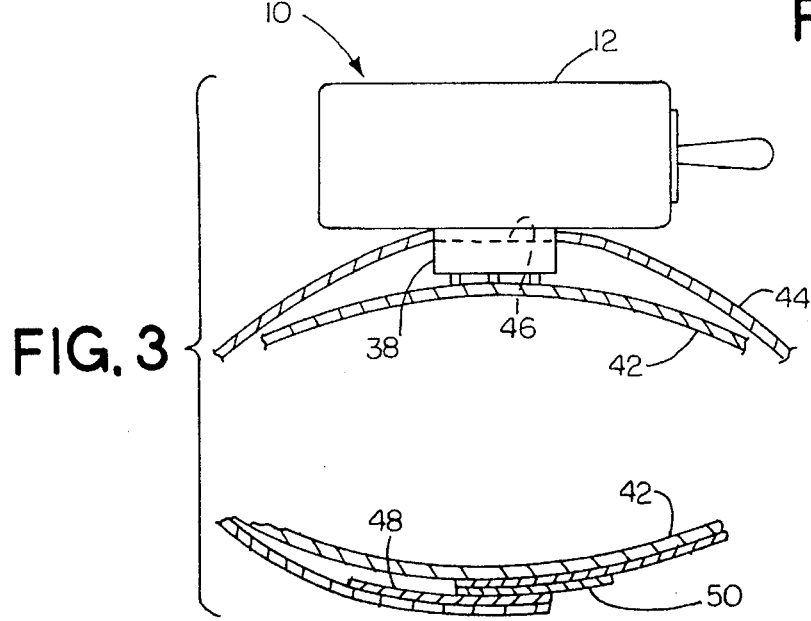
FIG. 3 is an elevational view of the pipe and duct run locator showing an alternative attachment modality.

For example, FIG. 3 shows an additional attachment means in the form of a strap which enables coupling of the locator 10 to a non-ferromagnetic conduit 42. The strap 44 is threaded through a slot 46 provided in the locator between the housing 12 and magnet retainer 38. The strap may be wrapped around the perimeter of the conduit and tied or otherwise secured together at its ends to hold the housing mechanically coupled to the conduit. Preferably fastening devices are provided at the ends of the strap for easy connection and disconnection, such as clamps, Velcro fastening elements and/or magnets. The illustrated strap has mating Velcro strips 48 and 50 attached to its ends for easy connection and disconnection of the strap ends.

Figure 4:
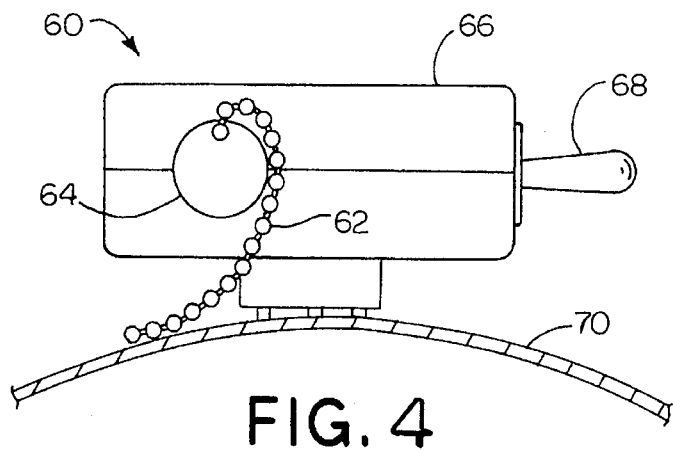
FIG. 4 is an elevational view of another embodiment of the present invention.

FIG. 4 shows another embodiment of a pipe and duct run locator according to the invention. This locator, indicated at 60, utilizes a motor driven whip that may be a flexible strap or, as shown, a chain 62. The chain 62 is attached at one end to a disc 64 which is rotated by an electric motor mounted in a housing 66. The housing also contains a battery for powering the motor and a switch 68 for turning the motor on and off. The housing may be coupled to a conduit 70 as above described in relation to the locator 10 of FIGS. 1–3.

When the switch 68 is moved to its on position, the chain 62 is caused to whip around the axis of the disc 64. The chain is of sufficient length for its free end to strike the conduit wall upon each rotation of the disc. This repeated striking mechanically vibrates the conduit wall and generates sound for transmission along the length of the conduit.

Figure 5:
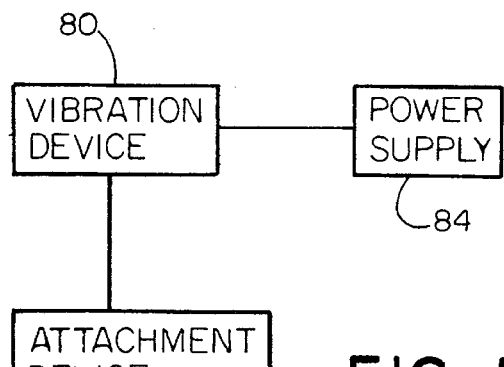
FIG. 5 is a diagrammatic illustration of the present invention.

The above described embodiments are examples of the many different ways in which the present invention may be practiced. More generally, an apparatus according to the invention includes a vibration device 80 and an attachment device 82 as diagrammatically illustrated in FIG. 5. A power supply 84 also will normally be needed to power the vibration device. Electrical vibration devices may be powered by battery or by use of a cord and plug connected to a standard wall outlet or similar source of electrical power. Mechanically powered devices may be powered by a mechanical wind-up mechanism.

By way further example, the vibration device 80 may be an electric clapper, bell, knocker or unbalanced wheel mechanism. Alternative attachment devices include clamps of various types including telescoping clamps, adjustable clamps, sliding clamps and push-on clamps. The apparatus may also be placed inside the conduit as by insertion through an opening in the wall of the conduit, through a plenum in the case of an air duct, through an end opening of the conduit, etc.

Other embodiments of the present invention may utilize a tone generator as the vibration device 80 with an attached speaker designed to function as a sound generator. Either mechanical vibration means or sound means may be utilized to generate an identifying characteristic individually. However, vibration and sound utilized together offer optimum results.

Figure 7:
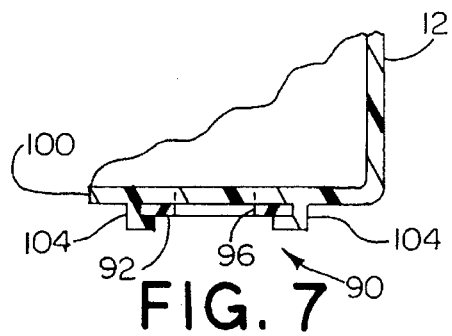
FIG. 7 is a sectional view taken along the line 7—7 of FIG. 6.
Figure 6:
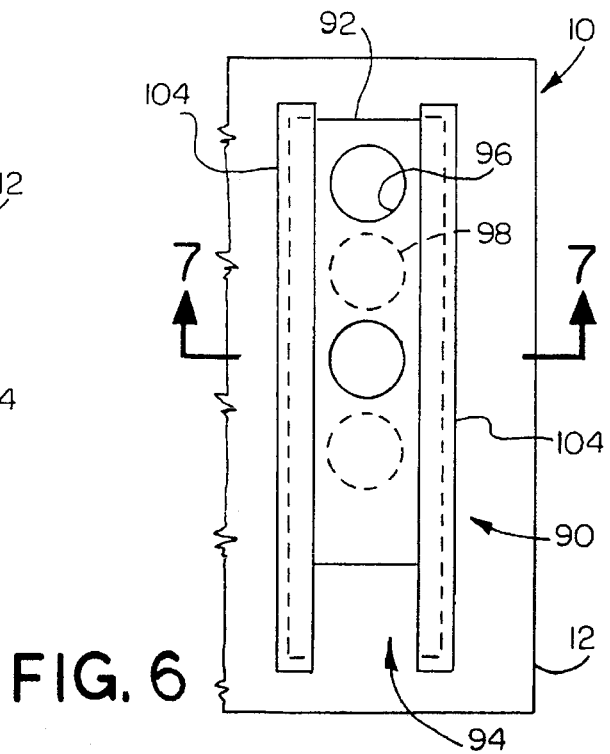
FIG. 6 is a fragment of a bottom plan view of the FIG. 1 locator provided with a volume adjusting device.

The invention also encompasses means for adjusting the volume of sound generated by the pipe and duct run locator. As shown in FIGS. 6 and 7, the locator 10 may be modified to include a volume adjusting device indicated generally at 90.

The volume adjusting device 90 includes a slider 92 which is movable in a guideway 94 between open and closed positions. When the slider is open (shifted downwardly in FIG. 6 from its illustrated position), openings 96 in the slider are aligned with correspondingly sized openings 98 in the bottom wall 100 of the housing 12. This maximizes the sound emitted from the interior of the housing by providing an open passageway for the sound. When the slider is closed as shown, portions of the slider between the openings 96 cover the openings 98 to block passage of sound therethrough. The slider may also be positioned between its full open and full closed positions to adjust the volume of emitted sound as desired.

As shown, the guideway may be formed by opposed L-shape tracks 104 formed integrally with the bottom wall 100 of the housing 12. The openings 98 in the housing preferably are located to direct sound towards the conduit to which the locator is attached. In the locator 10, a volume adjusting device 90 may be provided at each side of the attachment device 18.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A portable apparatus for identifying a heating and/or cooling duct at a second location in a building remote from a known first location of the heating and/or cooling duct, said apparatus comprising a housing, an electrical vibration device mounted in said housing and including means for generating human audible sound vibrations in the range of 20–10,000 Hz, means for connecting said electrical vibration device to a battery, and means for detachably securing said housing to a wall of the heating and/or cooling duct, and wherein said electrical vibration device includes a motor driven chain whip for repeatedly striking the duct.

2. The apparatus of claim 1, wherein said means for detachably securing includes a magnet for magnetically attaching said housing to the heating and/or cooling duct.

3. The apparatus of claim 1, wherein said means for detachably securing includes a strap for passing around the heating and/or cooling duct.

4. The apparatus of claim 1, wherein said vibration device operates on DC power at 12 volts or less.

* * * * *